United States Patent [19]
James et al.

[11] Patent Number: 5,835,742
[45] Date of Patent: Nov. 10, 1998

[54] SYSTEM AND METHOD FOR EXECUTING INDIVISIBLE MEMORY OPERATIONS IN MULTIPLE PROCESSOR COMPUTER SYSTEMS WITH MULTIPLE BUSSES

[75] Inventors: David V. James, Palo Alto; Donald N. North, Saratoga; Glen D. Stone, San Jose, all of Calif.

[73] Assignee: Apple Computer, Inc., Cupertino, Calif.

[21] Appl. No.: 259,611

[22] Filed: Jun. 14, 1994

[51] Int. Cl.⁶ .................................................. G06F 13/14
[52] U.S. Cl. ............................................ 395/310; 395/292
[58] Field of Search ................................... 395/842, 843, 395/846, 200.01, 200.09, 844, 845, 847, 848, 306, 308, 309, 310, 292

[56] References Cited

U.S. PATENT DOCUMENTS

| | | | |
|---|---|---|---|
| 4,475,155 | 10/1984 | Oishi et al. | 395/842 |
| 4,797,812 | 1/1989 | Kihara | 395/846 |
| 4,897,786 | 1/1990 | Pimm et al. | 395/288 |
| 5,077,664 | 12/1991 | Taniai et al. | 395/842 |
| 5,111,425 | 5/1992 | Takeuchi et al. | 395/842 |
| 5,218,678 | 6/1993 | Kelleher et al. | 395/275 |
| 5,287,471 | 2/1994 | Katayose et al. | 395/842 |
| 5,291,582 | 3/1994 | Drako et al. | 395/846 |
| 5,546,546 | 8/1996 | Bell et al. | 395/292 |

FOREIGN PATENT DOCUMENTS

| | | |
|---|---|---|
| 0392657 | 10/1990 | European Pat. Off. . |
| 0535822 | 4/1993 | European Pat. Off. . |

*Primary Examiner*—Eddie P. Chan
*Assistant Examiner*—Hiep T. Nguyen
*Attorney, Agent, or Firm*—Fenwick & West LLP

[57] ABSTRACT

An apparatus for performing indivisible memory operations on memory locations in remote memory means in multiple bus, multiple processor computer systems comprises a logic supervisor coupled to a bus bridge. The logic supervisor comprises a lock address register, a buffer address register, a command register, a first parameter register, a second parameter register, a first latch, a second latch, a comparator, and a controller. The controller is a state machine that observes instruction sequences intended to create an indivisible memory operation on a remote bus. When the logic supervisor detects an indivisible memory operation instruction sequence with a remote address, it gathers the data for the indivisible memory operation, inhibits the processor, and hands the data off to the bus bridge. When the logic supervisor receives a completion status from the bus bridge it places the returned value in memory and releases the processor. Should the logic supervisor detect an indivisible memory operation instruction sequence, but not a remote address, the logic supervisor does not participate in the indivisible memory operation.

22 Claims, 7 Drawing Sheets

SYSTEM AND METHOD FOR EXECUTING INDIVISIBLE MEMORY OPERATIONS IN MULTIPLE PROCESSOR COMPUTER SYSTEMS WITH MULTIPLE BUSSES

BACKGROUND OF THE INVENTION

1. Field of the Invention

This invention relates to computer architectures with multiple processors and more particularly to a system and method for executing indivisible memory operations in a computer system with multiple busses.

2. Description of the Background Art

Computer systems with multiple processors require a capability of performing indivisible updates on the memory of the system. These indivisible memory operations, also known as atomic operations, are commonly used to synchronize processes and processors. Common atomic operations include Fetch_Add, Compare_Swap, and Swap. The traditional method for executing atomic operations has the processor, which is performing the atomic operation, inhibit other computer system components using the processor-memory bus while the atomic operation is performed.

Recently, an alternative method to execute atomic operations has the processor execute two or more instructions. The processor, which is performing the atomic operation, executes an initial instruction to post a reservation, sometimes referred to as a lock, on the memory location needed for the atomic operation. The processor then executes the remaining instruction sequence. The processor may be interrupted at any time during the execution of the instruction sequence. The instruction sequence concludes with a conditional store instruction. The processor executes the conditional store instruction only if the reservation over the memory location still exists. Should the memory location be written to during the execution of the instruction sequence, the memory reservation will be canceled, and the conditional store instruction fails. If the conditional store instruction fails, the atomic operation has not been performed and the processor typically repeats the execution of the initial instruction and the instruction sequence until the conditional store instruction succeeds.

The prior art method of locking the processor-memory bus and the prior art method of using a reservation instruction and a conditional store instruction (a "reservation/conditional method") work well in multiple processor architectures with a single, common local bus. In particular, with a common local bus, each processor using the reservation/conditional method can monitor the actions of the other processors and can cancel the reservations when another processor writes to the reserved memory location. These methods, however, do not work well in larger multiple processor architectures with multiple busses where remote memory accesses are non-coherent. Such computer systems typically comprise more than one bus; each bus having processors and memories coupled to it. The busses are coupled to each other through bus bridges. For efficiency, memory accesses by a processor, which is common to one bus, are not broadcast to the other busses of the system computer. Thus, a processor is not able to monitor the accessing of reserved memory locations when the reserved memory address is for a memory common to a bus other than the common bus of the processor. Therefore, they cannot cancel reservations for memories coupled to other busses.

A number of approaches have attempted to overcome these problems in the prior art. One approach is to utilize the operating system to process atomic operations. When a processor is to execute an atomic operation, the program controlling the processor instructs the processor to step out of the application program to call the operating system. The operating system executes one of two possible instruction sequences depending on the memory address of the indivisible operation. If the address is local, the method for atomic operations on a local bus is used. If the address is remote, the operating system disables interrupts, and the operating system loads the parameters for the atomic operation into the bus bridge. The bus bridge forwards the atomic operation to the remote bus where the atomic operation is performed and the result is returned. The atomic operation on the remote bus may be performed by specialized hardware. Alternatively, the atomic operation on the remote bus may be performed by a processor on the remote bus. The remote processor is interrupted to interpret atomic operation messages which are directly or indirectly generated by operating system software on another bus. These approaches are inefficient in that the operating system must be called and additional instructions are required to check the user-supplied addresses to maintain system security. Furthermore, this approach may require that the operating system be modified, which is not always possible.

The overhead of calling the operating system to perform lock operations can be minimized if the user program uses lock instructions to access local memory and operating system calls to access remote memory. Although more efficient, this approach requires the programmer know if the memory location for an atomic operation is on the local bus or remote bus. This has the added disadvantage that the programmer must program atomic operations that will need remote memory locations differently from atomic operations that need local memory location.

A final approach is to lock the memory location needed by the atomic operation. This lock will prevent any other processor from writing to the locked memory location. This approach has a very serious flaw. If the atomic operation is interrupted by a context switch or abort command from the operating system, the atomic operation may not complete its function and unlock the memory locations. These locked memory locations are inaccessible to others. Thus, additional apparati are needed to search for and unlock the statically locked memory locations. Furthermore, this approach requires that a programmer use explicit lock and unlock instructions in the atomic operation. Not all instruction sets of processors contain such instructions.

There is a need for a system and method for executing atomic operations in computer systems with multiple busses, when data on the remote busses is accessed non-coherently. A programmer should be able to access the system and to invoke the method directly from an application program without having to call the operating system or any other outside system. The programmer should be able to program all atomic operations the same way whether an atomic operation requires accessing memory locations in a local memory or in a remote memory. Finally, the system should be capable of implementation within the instruction sets of existing processors. The system and method should not require modification to the processors.

SUMMARY OF THE INVENTION

The present invention overcomes the problems and shortcomings of the prior art with a system and method for performing indivisible memory operations on remote memory locations. The system comprises a logic supervisor coupled to each bus and to each bus bridge. The logic supervisor comprises a first latch, a second latch, a buffer address register, a lock address register, a command register, parameter registers, and a controller. The first latch and the second latch are used to latch and hold data from the bus, or to assert data on the bus. The buffer address register, the lock address register, the command register, and the parameter registers store data needed for the indivisible memory operation. The controller is a state machine that controls the logic supervisor.

The present invention also includes a method for executing an indivisible memory operation. The controller of the logic supervisor monitors its local bus for indivisible memory operations on remote memory locations. When the controller detects an indivisible memory operation on a remote memory location, the controller stores data, which the processor has impressed on the local bus, in the registers of the logic supervisor. When the processor generates a StoreConditional signal, the logic supervisor inhibits the processor and hands off the data stored in the registers to the bus bridge for execution of the indivisible memory operation. When the execution is complete, the logic supervisor places the returned value in memory and releases the processor. If the indivisible memory operation is on a memory location in a local memory means, the logic supervisor ignores the operation. Thus, the present invention advantageously provides programmers with a means for performing an indivisible memory operation regardless of whether the memory location is local or remote. The programmer need not program an indivisible memory operation on a remote memory location by one method and program an indivisible memory operation on a local memory location by another method.

DESCRIPTION OF THE PREFERRED EMBODIMENT

Figure 1:
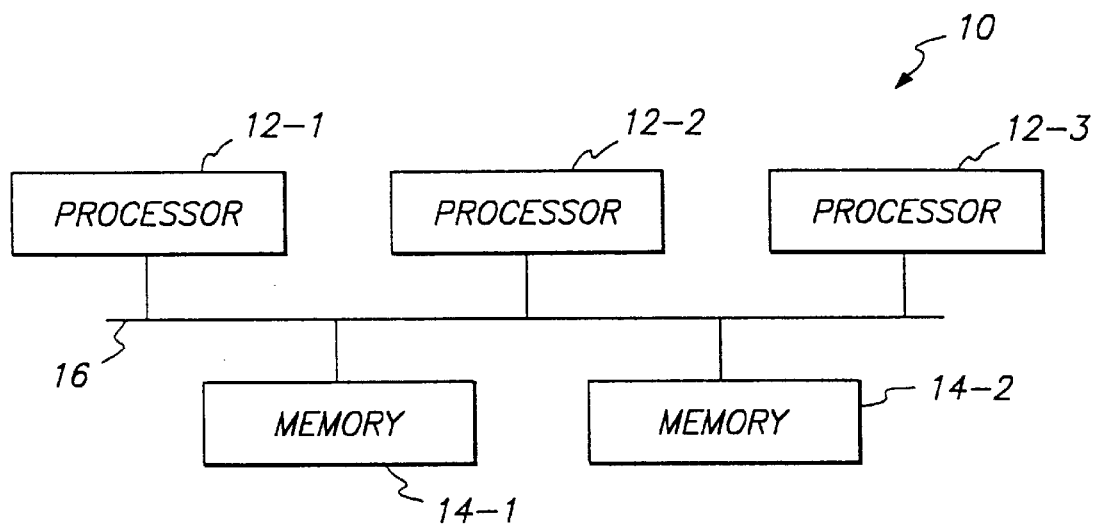
FIG. 1 is a block diagram showing a conventional multiple processor, single bus computer system.

Referring now to FIG. 1, a block diagram of a first prior art multiple processor computer system 10 is shown. The computer system 10 comprises a first processor 12-1, a second processor 12-2, a third processor 12-3, a first memory means 14-1, and a second memory means 14-2. The first processor 12-1, the second processor 12-2, the third processor 12-3, the first memory means 14-1, and the second memory means 14-2 are coupled together via a bus 16. Those skilled in the art will realize that the computer system 10 may comprise any number of processors and any number of memory means.

Each processor 12-1, 12-2, and 12-3 is a conventional processor capable of operating in a multiple processor computer system. In an exemplary embodiment each processor 12-1, 12-2, and 12-3 is a PowerPC processor manufactured by Motorola, Inc. of Schaumburg, Illinois. Alternatively, the processors 12-1, 12-2, and 12-3 may be Alpha processors from Digital Equipment Corporation of Maynard, Massachusetts. The processor includes an instruction set which controls the operations that the processor performs. The instruction set preferably includes LoadReserved and Store Conditional instructions which are used within indivisible memory operation instruction sequences. On the PowerPC processor, LoadReserved and Store Conditional refer to the instructions which are named "Load Word and Reserve Indexed" and "Store Word Conditional Indexed." On the Alpha processor, LoadReserved and StoreConditional refer to the instructions which are named "Load Memory Data Into Integer Register Locked" and "Store Integer Register Data Into Memory Conditional." The indivisible memory operations preferably comprise a Fetch_Add operation, a Compare_Swap operation, a Mask_Swap operation, a Little_Add operation, a Wrap_Add operation, and a Bounded_Add operation. (See the IEEE Std 1596–1992 Scalable Coherent Interface (SCI) for detailed definitions of these indivisible memory operations.) Those skilled in the art will recognize the indivisible memory operations and will realize that there are other possible indivisible memory operations. The processor may perform an indivisible memory operation on any memory location in any memory means 14-1, 14-2. The processor 12 preferably includes address-translation means for translating virtual addresses into physical addresses. This address-translation means also determines if an address is a legal address. If an address is an illegal address, the address-translation means generates an error signal.

Each memory means 14-1, 14-2 is a conventional random access memory and controller. Each memory means 14-1, 14-2 comprises a plurality of memory locations for storing data. The memory means 14-1, 14-2 preferably includes a controller for performing the indivisible memory operations, such as Fetch_Add, on the data stored in the memory means 14-1, 14-2 and on data entering the memory means 14-1, 14-2.

The bus 16 is a conventional bus for the transmission of address signals, data signals, and control signals. The bus 16 comprises an address bus for the transmission of address signals, a data bus for the transmission of data signals, and a control bus for the transmission of control signals. Each of the address bus, the data bus, and the control bus comprises a plurality of lines. Those skilled in the art will realize that each of the address bus, the data bus, and the control bus may comprise any number of lines. Alternatively, the control, address, and data signals could also be multiplexed on shared lines, as is clear to those skilled in the art. Furthermore, the bus 16 functionality may be provided by multiple data paths and switching circuits.

Figure 2:
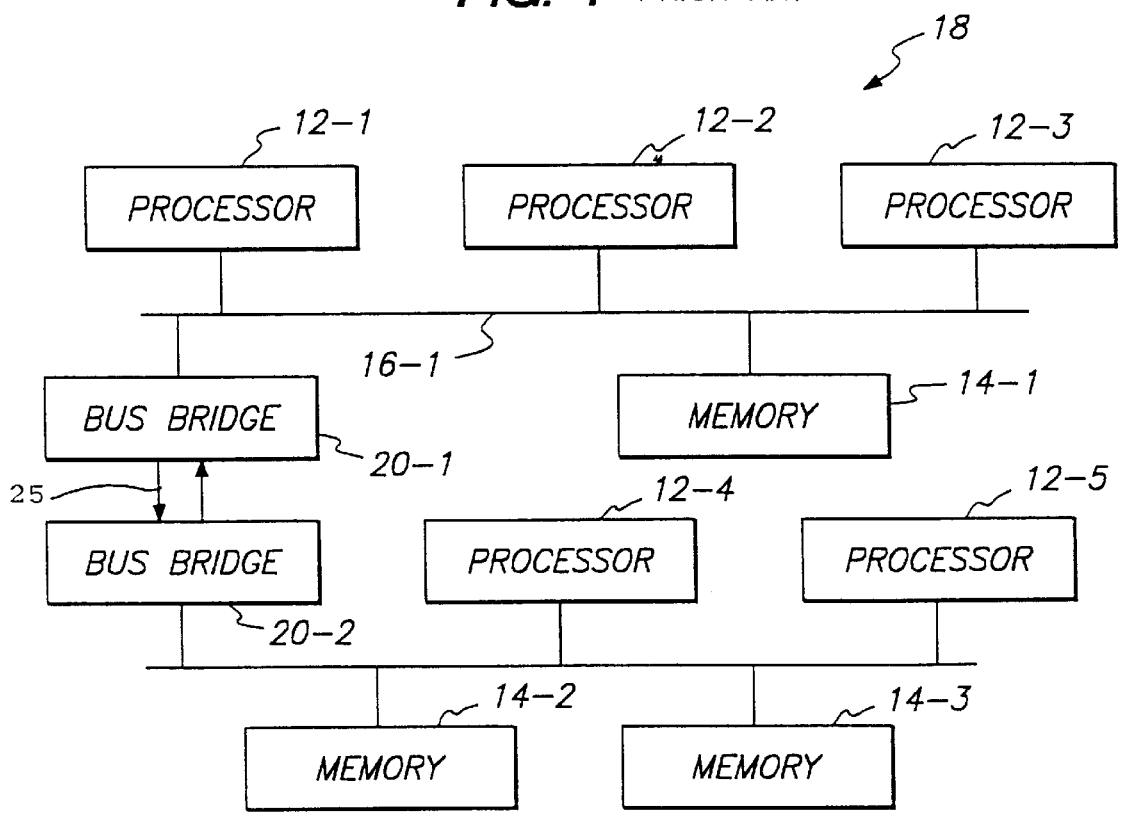
FIG. 2 is a block diagram showing a conventional multiple processor, multiple bus computer system.

Referring now to FIG. 2, a block diagram of a second prior art multiple processor computer system 18 is shown. The system 18 of FIG. 2 has a multiple bus, multiple processor architecture. For ease of understanding, the same reference numbers have been used in the second prior art system 18 for similar parts to those of the first prior art system 10. The computer system 18 comprises a first processor 12-1, a second processor 12-2, a third processor 12-3, a bus bridge 20-1, and a first memory means 14-1. The first processor 12-1, the second processor 12-2, the third processor 12-3, the bus bridge 20-1, and the memory means 14-1 are coupled together via a first bus 16-1. The computer system 18 further comprises a fourth processor 12-4, a fifth processor 12-5, a second memory means 14-2, a third memory means 14-3, and a second bus bridge 20-2. The fourth processor 12-4, the fifth processor 12-5, the second memory means 14-2, the third memory means 14-3, and the second bus bridge 20-2 are coupled together via a second bus 16-2. The first bus bridge 20-1 is coupled to the second bus bridge 20-2.

The processors 12-1, 12-2, 12-3, 12-4, and 12-5, the memory means 14-1, 14-2, and 14-3, and the busses 16-1, 16-2 are identical to those described above in connection with FIG. 1. The processors 12-1, 12-2, 12-3, 12-4, and 12-5 may perform indivisible memory operations on memory locations in any memory means 14-1, 14-2, and 14-3 whether the memory means 14-1, 14-2, and 14-3 is coupled to the same bus 16-1, 16-2 as the processor 12-1, 12-2, 12-3, 12-4, and 12-5, that is the local bus, or is coupled to another bus 16-1, 16-2, that is the remote bus. For example, the processor 12-1 may perform an indivisible memory operation on a memory location in memory means 14-1 or memory means 14-2.

The bus bridges 20-1, 20-2 are conventional bus bridges between a bus 16-1, 16-2 and bus like interconnects. Between the bus bridges 20-1, 20-2 is an interconnect 25 such as an IEEE Std 1596–1992 Scalable Coherent Interface (SCI). The bus bridges 20-1, 20-2 and their interconnect 25 between them send transactions between each other and serve as the coupling between the first bus 16-1 and the second bus 16-2. The bus bridges 20-1, 20-2, however, ignore LoadReserved and StoreConditional codes. Thus, when an indivisible memory operation appears on the bus 16-1, 16-2, the bus bridge 20-1, 20-2 will not react or receive data from the bus 16-1, 16-2. The bus bridges 20-1, 20-2 will transmit an indivisible memory transaction when specifically signaled to and when the data is specially presented to the bus bridge 20-1, 20-2. The term indivisible memory operation is used when a processor is operating on a memory location; the term indivisible memory transaction is used when the codes for an indivisible memory operation are to be transferred across the bus bridges 20-1, 20-2 and their interconnect 25.

Those skilled in the art will realize that any number of processors and memory means may be coupled to either the first bus 16-1 or to the second bus 16-2. Furthermore, those skilled in the art will realize that the computer system 18 may comprise more than 2 busses interconnected by a plurality of bus bridges and their accompanying interconnects.

The bus bridges 20-1, 20-2 do not forward all transactions generated by the processors 12-1, 12-2, 12-3, 12-4, or 12-5 to the remote bus 16-1, 16-2. When a processor 12-1, 12-2, 12-3, 12-4, or 12-5 accesses a memory location in a local memory means 14-1, 14-2, or 14-3, for efficiency purposes the bus bridge 20-1, 20-2 that is connected to the local bus 16-1, 16-2 does not transmit the operation to the other bus bridge 20-1, 20-2. For example, if processor 12-1 was performing an indivisible memory operation on a memory location in memory means 14-1, the bus bridge 20-1 would not transmit the signals generated by processor 12-1 to the bus bridge 20-2. For this reason, it is not possible for a processor 12-1, 12-2, 12-3, 12-4, or 12-5 to determine when a remote processor 12-1, 12-2, 12-3, 12-4, or 12-5 has modified memory locations in a remote memory means 14-1, 14-2, or 14-3. Continuing the example, processor 12-4 can not monitor memory accesses, in memory means 14-1, by processor 12-1. This inability for a processor 12-1, 12-2, 12-3, 12-4, or 12-5 to determine when a remote processor 12-1, 12-2, 12-3, 12-4, or 12-5 has modified memory locations in a remote memory means 14-1, 14-2, or 14-3 makes indivisible memory operations on memory locations in remote memory means 14-1, 14-2, or 14-3 impossible. If the memory locations in a memory means 14-1, 14-2, or 14-3 are modified by a local processor 12-1, 12-2, 12-3, 12-4, or 12-5 while a remote processor 12-1, 12-2, 12-3, 12-4, or 12-5 is performing an indivisible memory operation on them, the indivisible memory operation of the remote processor 12-1, 12-2, 12-3, 12-4, or 12-5 is invalid, and the remote processor 12-1, 12-2, 12-3, 12-4, or 12-5 may not validly complete it. For example, if processor 12-1 is attempting to perform an indivisible memory operation on a memory location in memory means 14-2. Processor 12-1 will not be able to determine if processor 12-4 modifies the memory location in memory means 14-2 while processor 12-1 is performing the indivisible memory operation. Thus, processor 12-1 will not be guaranteed that it performed a valid indivisible memory operation.

Figure 3:
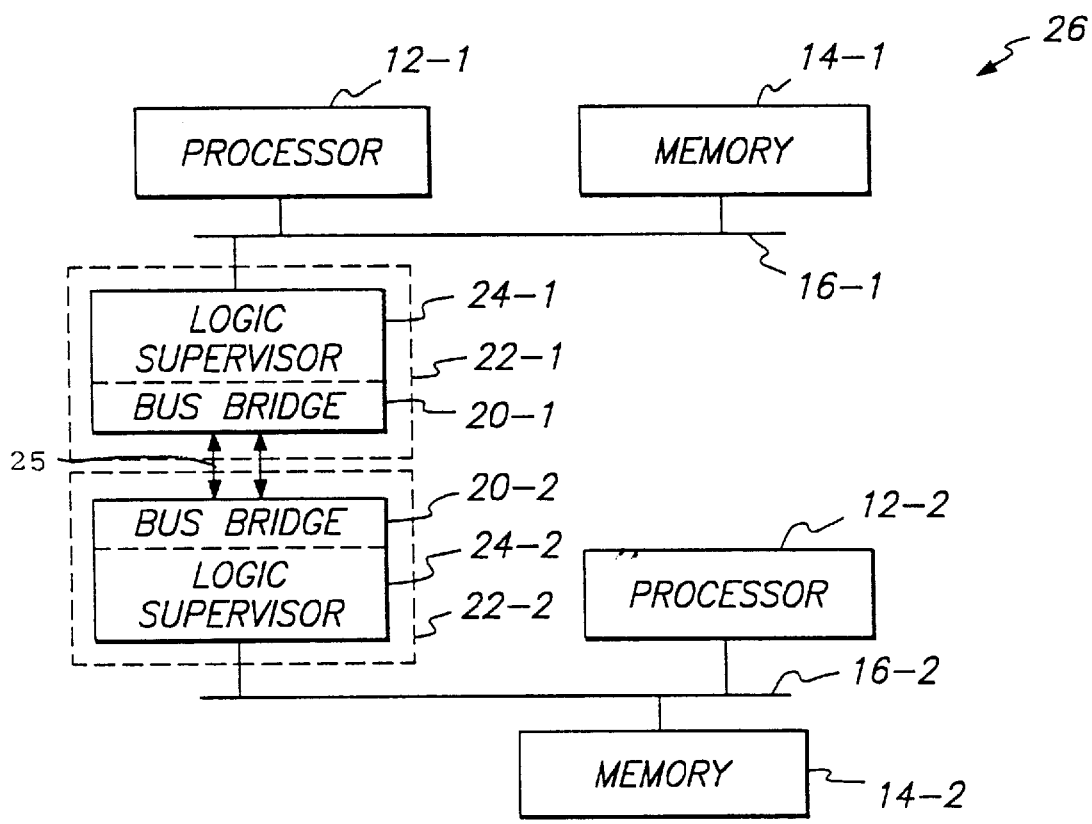
FIG. 3 is a block diagram showing one embodiment of a multiple processor, multiple bus computer system incorporating the present invention for executing indivisible memory operations.

Referring now to FIG. 3, a block diagram of one embodiment of a multiple processor computer system 26 that includes the present invention is shown. Again, for ease of understanding, like reference numerals have been used to reference like parts. The computer system 26 comprises a first processor 12-1, a first memory means 14-1, and a first interface 22-1. The first processor 12-1, the first memory means 14-1, and the first interface 22-1 are coupled together via a bus 16-1. The computer system 26 further comprises a second processor 12-2, a second memory means 14-2, and a second interface 22-2. The second processor 12-2, the second memory means 14-2, and the second interface 22-2 are coupled together via a bus 16-2. The first interface 22-1 and the second interface 22-2 are coupled together through interconnect 25.

The processors 12-1, 12-2, memory means 14-1, 14-2, and busses 16-1, 16-2 are identical to those described above in connection with FIG. 1. While in the preferred embodiment, each bus 16 has one processor 12 coupled to it, those skilled in the art will realize that the computer system 26 may comprise any number of processors 12, memory means 14. Furthermore, the computer system 26 may comprise more than two busses 16; each bus 16 having one or more processors 12, memory means 14, and interconnects 22 coupled to it.

Each interface 22-1, 22-2 comprises a logic supervisor 24-1, 24-2 and a bus bridge 20-1, 20-2. The bus bridge 20-1, 20-2 are identical to the bus bridges 20-1, 20-2 described above in connection with FIG. 2. The logic supervisor 24-1, 24-2 is a means for monitoring the activities of the processors 12-1, 12-2 coupled to a local bus 16-1, 16-2 and for performing indivisible memory operations on memory locations in a remote memory means 14-1, 14-2. The bus bridge 20-1 and the bus bridge 20-2 couple the first interface 22-1 to the second interface 22-2 through interconnect 25. The bus 16-1 is coupled both to the logic supervisor 24-1 and to the bus bridge 20-1. Similarly, the bus 16-2 is coupled both to the logic supervisor 24-2 and to the bus bridge 20-2.

Figure 4:
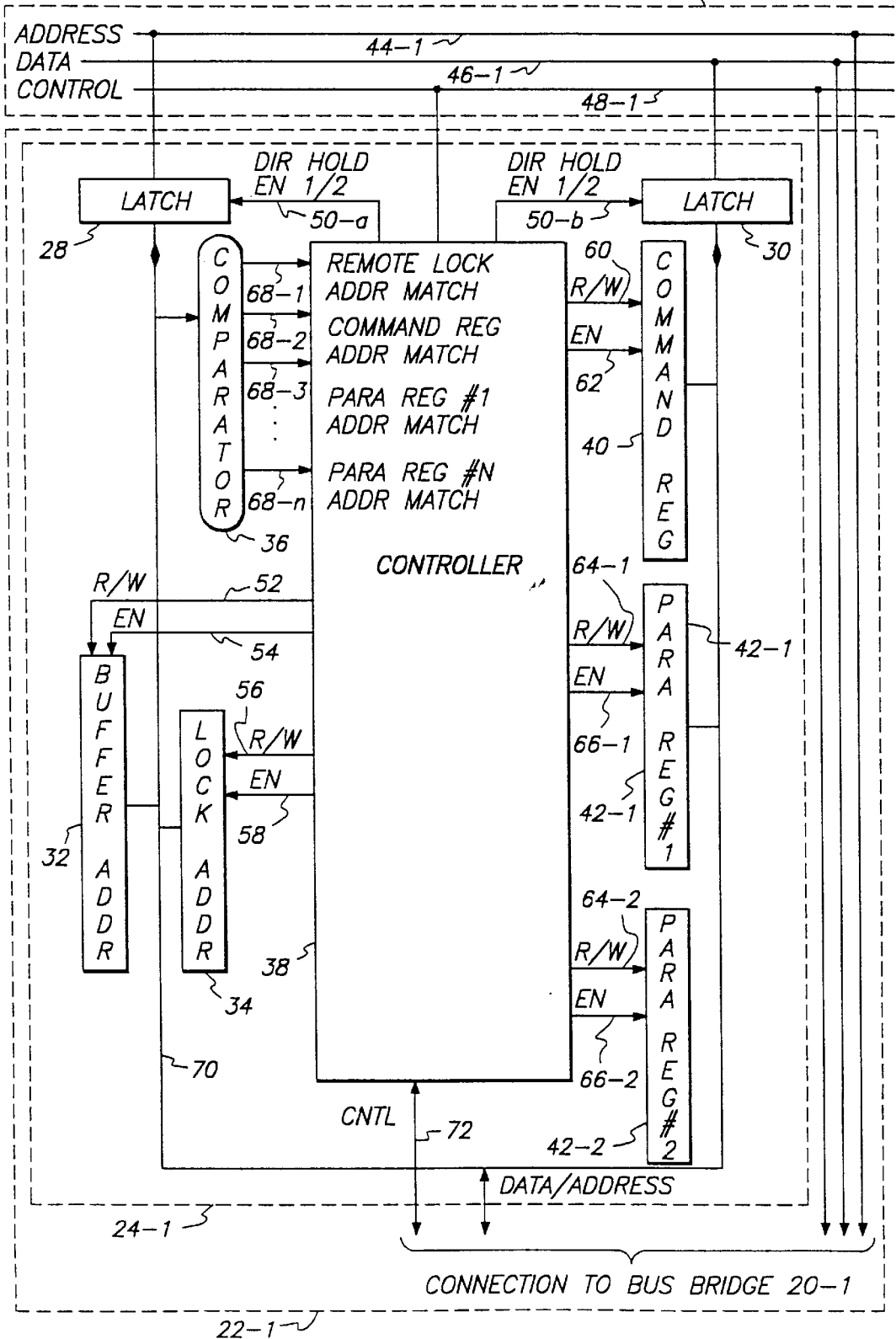
FIG. 4 is a block diagram showing the preferred embodiment of the logic supervisor.

Referring now to FIG. 4, a block diagram of the interface 22-1, showing the logic supervisor 24-1 in detail, is shown. The logic supervisor 24-1 comprises a first latch 28, a second latch 30, a buffer address register 32, a lock address register 34, a comparator 36, a controller 38, a command register 40, a first parameter register 42-1, and a second parameter register 42-2. Also shown in FIG. 4 is a bus 16-1. The bus 16-1 comprises an address bus 44-1, a data bus 46-1, and a control bus 48-1. While the logic supervisor 24-1 is shown coupled to the first bus 16-1, those skilled in the art will realize that each logic supervisor 24-1, 24-2 is coupled to its respective bus 16-1, 16-2 in a similar manner to that shown in FIG. 4.

The latches 28, 30 are conventional latches for capturing and holding data. The latches 28, 30 have two ports for receiving and sending data and have a command input for receiving control signals. The ports are preferably bi-directional; a port may receive data or may output data. The latches 28, 30 receive data or output data according to control signals received at the command input. The control signals determine whether a port receives or outputs data, determine whether or not the latch 28, 30 is enabled to operate, and determine whether or not the latch 28, 30 holds data. The first port of the first latch 28 is coupled to the address bus 44-1, and the second port of the first latch 28 is coupled to the buffer address register 32, the lock address register 34, and the bus bridge 20-1 via an internal bus 70. The command input of the first latch 28 is coupled to the controller 38 by a line 50-a. The first port of the second latch 30 is coupled to the data bus 46-1, and the second port of the second latch 30 is coupled to the command register 40, to the parameter registers 42-1 and 42-2, and to the bus bridge 20-1 via the internal bus 70. Similar to the first latch 28, the command input of the second latch 30 is coupled to the controller 38 by a line 50-b.

The buffer address register 32 is a register for storing data. The buffer address register 32 stores an address of a memory location in a memory means 14 in which the logic supervisor 24 will store the contents of the remote memory location, upon which the indivisible memory operation is to be performed, before the execution of the indivisible memory operation. The buffer address register 32 has data inputs and data outputs that are coupled to the second port of first latch 28 via the internal bus 70. The buffer address register 32 also has a R/W input and an Enable input. The buffer address register 32 receives, holds, or outputs data according to signals received at the Enable input and R/W input. The Enable input is coupled to the controller 38 by a line 54, and the R/W input is coupled to the controller 38 by a line 52.

The lock address register 34 is a register for storing data. The lock address register 34 stores an address of a memory location in a remote memory means 14 upon which the local processor 12-1 desires to perform an indivisible memory operation. The lock address register 34 has data inputs and data outputs that are coupled to the second port of the first latch 28 via the internal bus 70 and to the bus bridge 20-1 again via the internal bus 70. The lock address register 34 also has a R/W input and an Enable input. The lock address register 34 receives, holds, or outputs data according to signals received at the Enable input and the R/W input. The Enable input is coupled to the controller 38 by a line 58, and the R/W input is coupled to the controller 38 by a line 56.

The comparator 36 is a comparator for comparing input signals to pre-recorded data and generating an output signal in response to the comparison. The comparator 36 comprises at least five decoders for decoding addresses. Each decoder is dedicated to recognizing the address of one of the buffer address register 32, the lock address register 34, the command register 40, the first parameter register 42-1, and the second parameter register 42-2. Each decoder has a first input that is coupled to the first latch 28 to receive addresses. Each decoder also has a second input that is hard wired to a predetermined address. Those skilled in the art will realize how to construct the comparator 36. The comparator 36 has a data input coupled to the first latch 28 via the internal bus 70. The comparator 36 has a plurality of outputs; the outputs are coupled to the controller 38 by a plurality of lines 68-1 to 68-n. Each output has a corresponding line 68. The comparator 36 receives an address as an input from the first latch 28. The comparator 36 compares the input address to pre-recorded addresses of a register of the logic supervisor 24. If the input address matches an address of one of the registers, the comparator 36 generates a signal at the output that corresponds to the register. Alternatively, the comparator 36 may have a single output line 68. The comparator 36 would then code its output signals to indicate the recognized address.

The controller 38 is preferably combinatorial logic, or similar digital circuitry, and storage elements for controlling the operation of the logic supervisor 24. The controller 38 monitors the control bus 48-1; accepts input signals from the comparator 36; generates signals to store data in the buffer address register 32, the lock address register 34, the command register 40, and in the parameter registers 42-1 and 42-2; generates and receives control signals and data signals to and from the bus bridge 20-1; and generates signals to store data in a local memory means 14. The controller 38 includes a comparator means for decoding and recognizing code signals from the control bus 48-1. The controller 38 has a plurality of inputs and outputs for data and commands. A first input and output are coupled to the control bus 48-1. A second input and output are coupled to the bus bridge 20-1. The controller 38 also comprises a storage means for storing state variables. Those skilled in the art will recognize how to construct a controller 38 that is capable of performing the functions by asserting those signals as will be described with reference to the state diagram of FIG. 5.

The command register 40 is a register for storing data that identifies the specific indivisible memory operation that a local processor 12 desires to execute. The command register 40 has data inputs and data outputs that are coupled to the second port of the second latch 30. The command register 40 also has a R/W input and an Enable input. The command register 40 stores, holds, or outputs data according to signals received at the Enable input and R/W input. The Enable input is coupled to the controller 38 by a line 62, and the R/W input is coupled to the controller 38 by a line 60.

The parameter registers 42-1, 42-2 are registers for storing data. The parameter registers 42-1, 42-2 store data necessary for the indivisible memory operation that is to be performed. Many indivisible memory operations, such as Fetch_Add, need only one parameter. Other indivisible memory operations require two or more parameters. The parameter registers 42-1, 42-2 have data inputs and data outputs that are coupled to the second port of the second latch 30 via the internal bus 70. Each parameter register 42-1, 42-2 also has a R/W input and an Enable input. The parameter registers 42-1 and 42-2 receive, hold, or output data according to signals received at the Enable inputs and R/W inputs. The Enable inputs of parameter registers 42-1, 42-2 are coupled to the controller 38 by lines 66-1, 66-2. The R/W inputs are coupled to the controller 38 by a line 64-1, 64-2, respectively.

The buffer address register 32, the lock address register 34, the command register 40, and the parameter registers 42-1 and 42-2 have unique addresses within the computer system 26. Thus, a processor 12-1, 12-2 may write data to one of these registers as it would address data to any memory location in a local memory means 14-1, 14-2.

In an alternative embodiment of the computer system 26 where there is more than one processor coupled to a bus, the logic supervisor would have a buffer register, a lock address register, a command register, and a parameter register dedicated exclusively to each processor. The comparator 36 would be able to recognize the addresses for each of these registers. In yet another alternative embodiment, should the instruction set of a processor have indivisible memory operations that require more than 2 parameters, additional parameter registers 42 may be added to the logic supervisor 24 and coupled to the controller 38 and the second port of the second latch 30.

As can be seen in FIG. 4, the bus 16-1 is coupled directly to the bus bridge 20-1. Operations that require communications across the bus bridge 20-1, excluding LoadReserved and StoreConditional operations, are transmitted directly through the bus 16-1 to the bus bridge 20-1. As was discussed with reference to FIG. 2, the bus bridge 20-1 will ignore indivisible memory operations. When the logic supervisor 24-1 recognizes a remote LoadReserved code, the logic supervisor 24-1 gathers the data and signals the bus bridge 20-1, on the logic supervisor control bus 72, to receive the data and to complete the remote indivisible memory transaction through the interconnect 25. When signaled by the logic supervisor 24-1 on the logic supervisor control bus 72, the bus bridge 20-1 will receive data and transmit the indivisible memory transaction to the remote memory means 14-2. During other transactions across the bus bridge 20-1, the logic supervisor 24-1 is inactive and does not participate.

Figure 5:
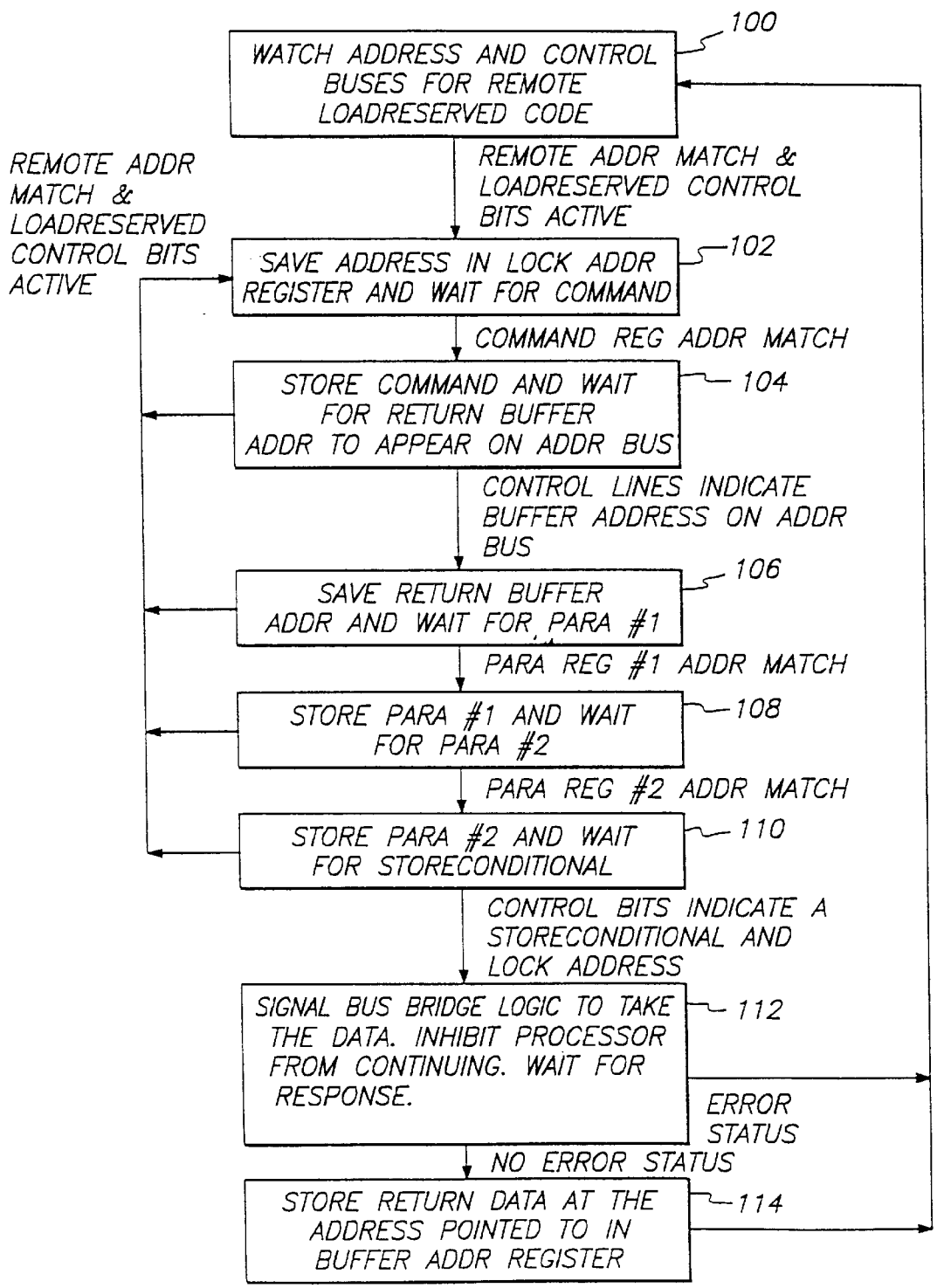
FIG. 5 is a state diagram showing the state transitions, generated signals, and expected signals of the controller of the logic supervisor.

Referring now to FIG. 5, a state diagram of the operation of the controller 38 is shown. FIG. 5 shows some of the states of the controller 38 and some of the signals that the controller 38 generates and receives. FIG. 5 is a high level state diagram; it shows only the significant states and signals necessary to enable the present invention. Those skilled in the art will recognize the additional states and signals necessary to implement the controller 38.

In state 100, the controller 38 monitors the control bus 48-1 for a remote indivisible memory operation. Whenever a device of the computer system 26 transmits address data on the address bus 44-1, the controller 38 signals the first latch 28, by impressing a signal on the line 50-*a*, to receive the address data and to hold the address data. Thus, the first latch 28 stores every address asserted on the address bus 44-1. The first latch 28 holds the address and, on instructions from the controller 38 impressed on the line 50-*a*, transmits the address to the comparator 36 on the internal bus 70. The comparator 36 decodes the address. The range of addresses supported on the address bus 44 is preferably large enough to include all utilized addresses on the local as well as remote busses. To detect addresses in remote memory means 14, the comparator 36 compares addresses to ranges. When the comparator 36 finds an address that corresponds to remote memory means 14, the comparator 36 generates a signal that it has found a remote memory address and asserts a signal on the line 68-1.

Simultaneous with the foregoing, the controller 38 monitors the control bus 48-1. The controller 38 monitors the control bus 48-1 to detect the execution of an indivisible memory operation. For example, a LoadReserved instruction will be used to describe the preferred embodiment, however, those skilled in the art will realize that other remote memory operations may be used. A LoadReserved instruction indicates that the corresponding operation on a memory location is intended to be performed indivisibly. A LoadReserved is preferably indicated by the setting of certain bits of the signals on the control bus 48. In order to leave state 100 and move to state 102, the controller 38 must detect a LoadReserved instruction on the control bus 48-1 and receive a signal from the comparator 36 that the indivisible memory operation will be on a memory location in a remote memory means 14. If the controller 38 receives a signal from the comparator 36 that the indivisible memory operation is on a remote memory address, the controller 38 responds by impressing a signal on the control bus 48-1 to signal the processor 12-1 to receive what ever data is on the data bus 46-1 as the return data from the load signal. Thus the controller 38 is returning a NULL value for the LoadReserved instruction. The controller 38 must generate this NULL value because the processor 12-1 expects to receive a return value from the LoadReserved code that it generated. The processor 12-1 will not continue operation until it receives a value. If the controller 38 does not receive a signal from the comparator 36 that the indivisible memory operation is on a remote memory address, the controller 38 does not participate in the indivisible memory operation and remains in state 100. The processor 12-1 executes the indivisible memory operation on the local memory address.

In state 102, the controller 38 generates a first signal and asserts the first signal on the R/W line 56 for the lock address register 34 to receive the input of the remote memory location on which the indivisible memory operation is to be performed. At the same time, the controller 38 generates a second signal and asserts the second signal on the line 50-*a* for the first latch 28 to unload the data it holds onto the internal bus 70. Thus, the lock address register 34 receives and records the address held in the first latch 28. The controller 38 then, after storing the address in the lock address register 34, waits to receive a signal of the specific indivisible memory operation that the processor 12-1 is performing. The processor 12-1 will generate a first signal and impress the first signal on the data bus 46 that indicates the indivisible memory operation. The processor 12-1 also generates a second signal and asserts the second signal on the control bus 48-1 to signal a store of the data on the data bus 46-1 into the command register 40. The controller 38 generates a signal and impresses the signal on the line 50-*a* to enable the first latch 28 to latch an address from the address bus 44-1. If the comparator 36 matches the latched address with the address for the command register 40, the controller 38 leaves state 102 and proceeds to state 104.

In state 104, the controller 38 generates a first signal and asserts the first signal on the line 50-*b* to enable the second latch 30 to latch the command from the data bus 46-1. The controller 38 then generates a second signal and a third signal, a write signal and an enable signal respectively, and asserts these signals on the R/W line 60 and the enable line 62, respectively. Simultaneously, the controller 38 generates a fourth signal and asserts the fourth signal on the line 50-*b* instructing the latch to transfer its data to the internal bus 70. Thus, the controller 38 stores the command in the command register 40. The controller 38 then waits for the buffer address to appear on the address bus 44-1.

The buffer address is an address in the memory means 14-1 at which the controller 38 will record the contents of the memory location, on which the indivisible memory operation is to be executed, before the execution of the indivisible memory operation. The processor 12-1 preferably transmits this address over the address bus to take advantage of the address translation functions in the processor 12-1. The processor 12-1 preferably checks each virtual address before converting it to a physical address, which is transmitted over the address bus 46, for its status as a valid virtual address. If the processor 12-1 generates an invalid address, the address translation routines trigger a trap and generate an error signal. Thus, the buffer address register 32 receives the buffer address off the address bus 44-1, and therefore, the buffer address need not be checked again for validity. Alternatively, the processor 12-1 may transmit the buffer address over the data bus 46. In state 104, the controller 38 monitors the control bus 48-1 for a store command. When the controller 38 detects a store command on the control bus 48-1, the controller leaves state 104 and enters state 106.

While in state 104, if the comparator 36 matches a remote address signal from the address bus 44-1 and the controller 38 detects a LoadReserved code on the control bus 48-1, the controller 38 leaves state 104 and returns to state 102. The appearance of a remote address signal on the address bus 44-1 and a LoadReserved code on the control bus 48-1 indicate that the original reservation has been lost or canceled on the remote address and that the logic supervisor 24 should abandon the indivisible memory operation. The controller 38 returns to state 102 to carry out the next indivisible memory operation signaled by the LoadReserved code and the remote address.

In state 106, the controller 38 generates a first signal and a second signal and asserts the first signal and the second signal on the R/W line 52 and on the enable line 54, respectively so than the buffer address register 32 receives and records the buffer address. As the controller 38 is enabling buffer address register 32 and writing to the buffer address register 32, the controller 38 generates a third signal and asserts the third signal on the line 50-a. The third signal instructs the first latch 28 to output data onto the internal bus 70. Thus the buffer address is stored in the buffer address register 32. The controller 38 then waits for the first parameter needed for the indivisible memory operation. In the state diagram shown in FIG. 5, the indivisible memory operations require two parameters. Some indivisible memory operations may require more than two parameters for other architectures. For these indivisible memory operations, the controller 38 requires additional states similar to state 106 for storing the additional parameters. Those skilled in the art will recognize the additional states and how to add the additional states. When the comparator 36 detects the address of the first parameter register 42-1 and signals the controller 38, the controller 38 generates a signal on line 50-b for the second latch 30 to store the data on the data bus 46-1, and the controller 38 leaves state 106 and proceeds to state 108.

In state 108, the controller 38 generates a write signal and an enable signal and asserts the signal on line 64-1 and on line 66-1. At the same time the controller 38 asserts a signal on the line 50-b for the second latch 30 to output data onto the internal bus 70. Thus, the first parameter register 42-1 stores the first parameter. The controller 38 then waits for the address of the second parameter. When the comparator 36 detects the address of the second parameter register 42-2 and signals the controller 38, the controller 38, once again, asserts a signal on the line 50-b for the second latch 30 to store the data on the data bus 46-1, and the controller 38 leaves state 108 and proceeds to state 110.

In state 110, the controller 38 generates a write signal and an enable signal and asserts the signals on the line 64-2 and on the line 66-2. As in state 108, at the same time, the controller 38 asserts a signal on line 50-b for the latch to unload its data onto the internal bus 70. In this way, the controller 38 stores the second parameter in the second parameter register 42-2. The controller 38 then waits for a StoreConditional code to appear on the control bus 48-1. As in state 104, if in states 106, 108, or 110, a remote address and LoadReserved code are detected by the comparator 36 and controller 38 respectively, the controller 38 returns to state 102. In this situation, as in state 104, the reservation is lost and the logic supervisor 24 abandons the indivisible memory operation.

The controller 38 leaves state 110 and proceeds to state 112 when it detects a StoreConditional code on the control bus 48-1, and the address is for any remote memory location. In state 112, the controller 38 generates the signals necessary to read the lock address register 34, the command register 40, and the parameter registers 42-1, 42-2, transfers the data from the registers to the bus bridge 20-1 through the internal bus 70. The controller 38 then generates a signal and asserts the signal on the logic supervisor control bus 72 for the bus bridge 20-1 to generate an indivisible memory transaction. Thus the logic supervisor 24-1 signals the bus bridge 20-1 to generate the indivisible memory transaction and specially presents the data. The controller 38 then generates a signal and asserts the signal on the control bus 48-1 to inhibit the processor 12. In the alternate embodiment where there are multiple processors 12 coupled to the local bus 16-1, the controller 38 must include a signal indicating the specific processor 12 that it is inhibiting.

When the transaction is generated by one of the bus bridges 20, such as 20-1, the address provided by logic supervisor 24-1 is typically translated by bus bridge 20-1 into an intermediate address for use on the interconnect 25 between bus bridge 20-1 and the other bus bridge 20-2. When the transaction generated by bus bridge 20-1 is observed by another, such as 20-2, its acceptance is based on the address contained within the transaction. When accepted by the remote bus bridge 20-2, this address within the transaction is translated from the intermediate address (used between bus bridges) to an address used within computer system 26.

When processed by the remote bus bridge, the bus bridge 20-2 generates the appropriate signals to perform the indivisible memory operation. Preferably, the memory means 14, which holds the lock-transaction address, performs the computational portion of the indivisible memory operation. Alternatively, the remote bus bridge 20-2 or a remote processor 12-2, remote being remote to the sending logic supervisor 24-1, may perform the computations. The device performing the computations and the bus 16-2 between the device and the memory means 14-2 must, however, be locked. For efficiency purposes therefore, the memory means 14-2 preferably has computational functionality and performs the computations. After the indivisible memory operation is performed, a completion status is returned to the sending logic supervisor 24-1.

After inhibiting the processor 12-1, the controller 38 waits to receive a completion status from the bus bridge 20-1. The controller 38 will receive the completion status over the logic supervisor control bus 72 that couples the controller 38 to the bus bridge 20-1. When the completion status is received by the sending logic supervisor 24, the action of controller 38, which is in state 112, depends on the status value which is returned. If the status returns an error code from the bus bridge 20-1, the controller 38 abandons the indivisible memory operation, terminates the StoreConditional access with an error, removes the inhibition on the processor 12-1, and returns to state 100.

When the controller 38, in state 112, receives a no error status when the status value is returned from the bus bridge 20, the controller 38 asserts a signal on the line 50-*b* so that the second latch 30 stores data from the internal bus 70. The returned status includes the value contained in the remote memory location before the indivisible memory operation. As the controller 38 is signaling the second latch 30 to store data, the bus bridge 20-1 is generating a signal of the return status on the internal bus 70. In this way, the prior contents of the memory location are stored in the second latch 30.

In state 114, the controller 38 simultaneously generates signals to read the address stored in the buffer address register 32 and to latch the address into the first latch 28. The controller 38 asserts these signals on the line 52, the line 54, and the line 50-*a*. The controller 38 then generates a signal and asserts the signal on the control bus 48-1 to store data on the data bus 46 in the memory location on the address bus 44-1. Simultaneously with generating the store signal, the controller 38 signals, on the line 50-*a*, the first latch 28 to impress the buffer address on the address bus 44-1 and signals, on the line 50*b*, the second latch 30 to impress the response value on the data bus 46-1. Thus, the controller 38 stores the response value in the memory location at the buffer address. The controller 38 then removes the inhibition on the processor 12-1 and returns to state 100.

Figure 6:
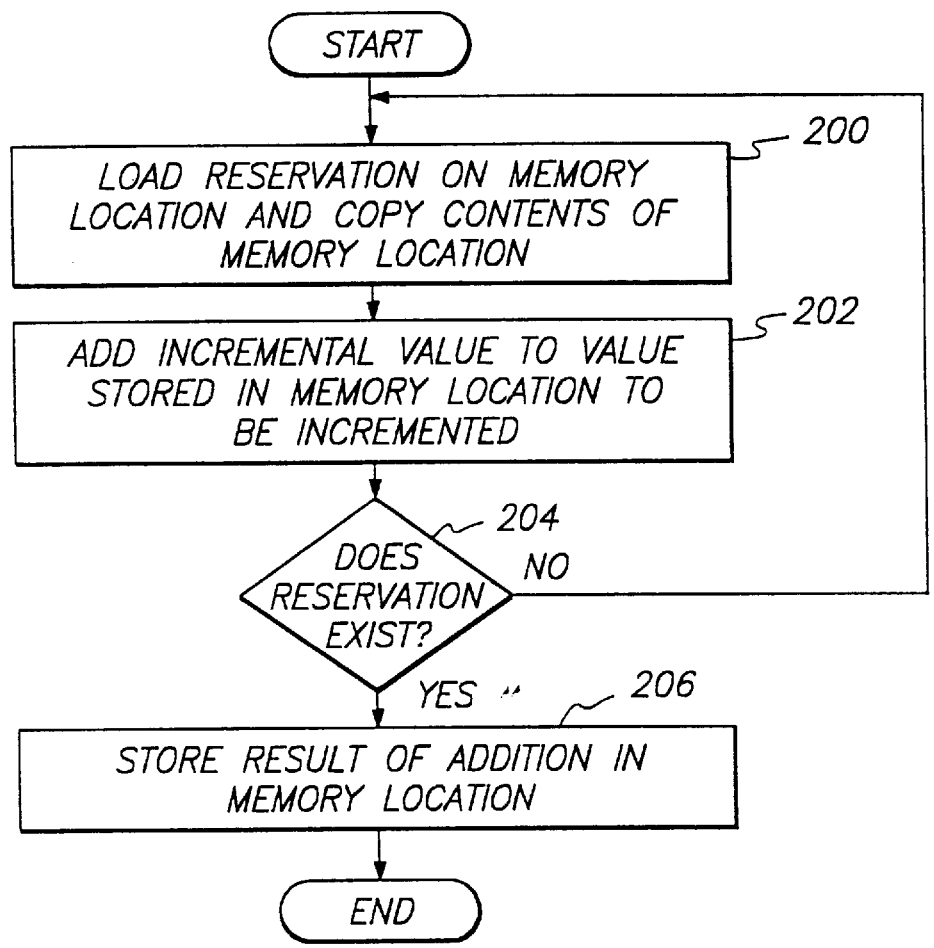
FIG. 6 is a flowchart showing a prior art method for performing an indivisible memory operation.

Referring now to FIG. 6, a flow chart of the prior art method for a processor 12 to execute an indivisible memory operation is shown. FIG. 6 shows the execution of a Fetch__Add function. The method for performing other indivisible memory operations is substantially similar with appropriate modifications for the specific operation on memory desired. Beginning in step 200, the processor 12 copies the contents of a memory location that is to be incremented. The processor 12 also sets the appropriate control bits to reserve the memory location. Should the processor 12 be interrupted during the execution of the steps of the indivisible memory operation, the control bits will be reset, and the reservation will be lost. In step 202, the processor 12 adds the incremental value to the contents of the memory location. The processor 12 then, in step 204, determines if the control bits that signal the reservation of the memory location are still set. If the control bits are still set, the processor 12, in step 206, stores the results of the addition in step 202 into the memory location, and the method ends. If, in step 204, the control bits are not set, the method returns to step 200 to repeat the function.

Figure 7:
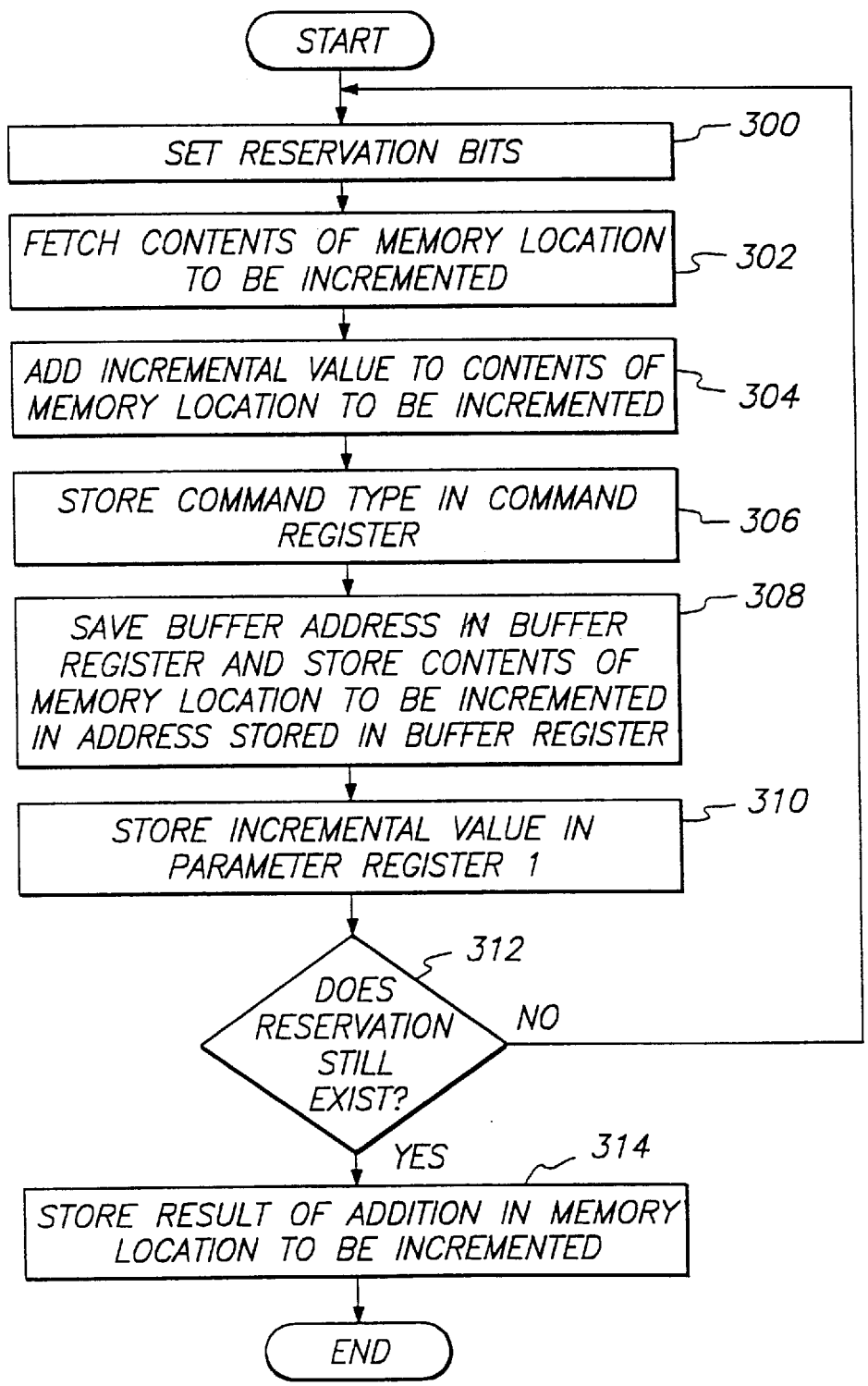
FIG. 7 is a flowchart showing the preferred method for performing an indivisible memory operation with the present invention.

Referring now to FIG. 7, a flow chart of the preferred method of performing an indivisible memory operation with the present invention is shown. As can be seen in FIG. 6, the addition in the prior art method took place internally to the processor 12. The preferred method exposes all functions performed by the processor 12 so that the logic supervisor 24 can monitor the functions and capture data. Beginning in step 300, the processor 12 sets the control bits to reserve a memory location for an indivisible memory operation. The processor 12 then, in step 302, issues a signal to fetch the contents of the memory location to be incremented. If the memory location to be incremented is in a local memory means 14, the logic supervisor 24 ignores the indivisible memory operation. If the memory location is in a remote memory means 14, the logic supervisor will begin to capture data. If the memory location to be incremented is in a local memory means 14, the processor 12 will be able to access the memory location. If, however, the memory location is in a remote memory means 14, the logic supervisor 24 must respond, or the access would fail. If the access fails, the processor 12 would wait indefinitely for a response. Therefore, the logic supervisor 24, when it receives a remote address signal and a LoadReserved code, generates a NULL response to prevent the processor 12 from trapping. In step 304, the processor 12 adds the incremental value to the contents of the memory location. The processor 12 in step 306 stores the command type, such as Fetch__Add or Compare Swap, in the command register 40. This step, with some future steps, is not needed to complete the indivisible memory operation on a memory location in a local memory means 14. In order to make the programming identical for all indivisible memory operations, whether on memory locations in local or remote memory means 14, this step and others are included in all indivisible memory operations. In step 308, the processor 12 stores the contents of the memory location to be incremented into another memory location. If the memory location is in a local memory means 14, then this step saves the contents of the memory location, that is to be incremented, before execution of the indivisible memory operation. If the memory location is in a remote memory means 14, then this step does not save the prior value. The step, however, does place the address of the memory location, where the prior value is to be stored by the logic supervisor 24, on the address bus 44-1. The address of this memory location is the buffer address. By storing to this address, rather than moving the address to a specific memory-mapped logic supervisor register, the address translation functions of the processor 12 can be used. The processor 12 stores the unmodified value addressed by the indivisible memory operation to transparently support indivisible memory operation addresses that are on the local bus. In this way, the buffer address appears on the address bus 44, and the logic supervisor 24 captures the buffer address from the address bus 44. The address translation functions of the processor 12 analyze the buffer address and generate an error signal to abort the user program if the buffer address is an illegal address. Thus, the prior value is stored in the memory location at the buffer address by this step, or this step signals to the logic supervisor 24 where to store the prior value. Finally, in step 310, the processor 12 stores the incremental value in parameter register 42-1. If the indivisible memory operation requires more than one parameter, steps identical to step 310, except that parameter register 42-2 through 42-*n* are used, may be added to the current method.

In step 312, the processor 12 determines if the control bits that indicate the reservation are still set. If the reservation still exists, the processor 12 generates a StoreConditional access to store the results of the addition in step 304 in the memory location. If the memory location is in a local memory means 14, the store takes place. If the memory location is in a remote memory means 14, the logic supervisor 24 recognizes the StoreConditional access, generates a signal to inhibit the processor 12 from using the bus, and generates the signals to hand off the data to the logic supervisor 24 for the execution of the indivisible memory operation. When the indivisible memory operation is complete, the logic supervisor 24 stores the prior contents of the memory location at the buffer address and releases the processor 12. The method is then complete.

Figure 8:
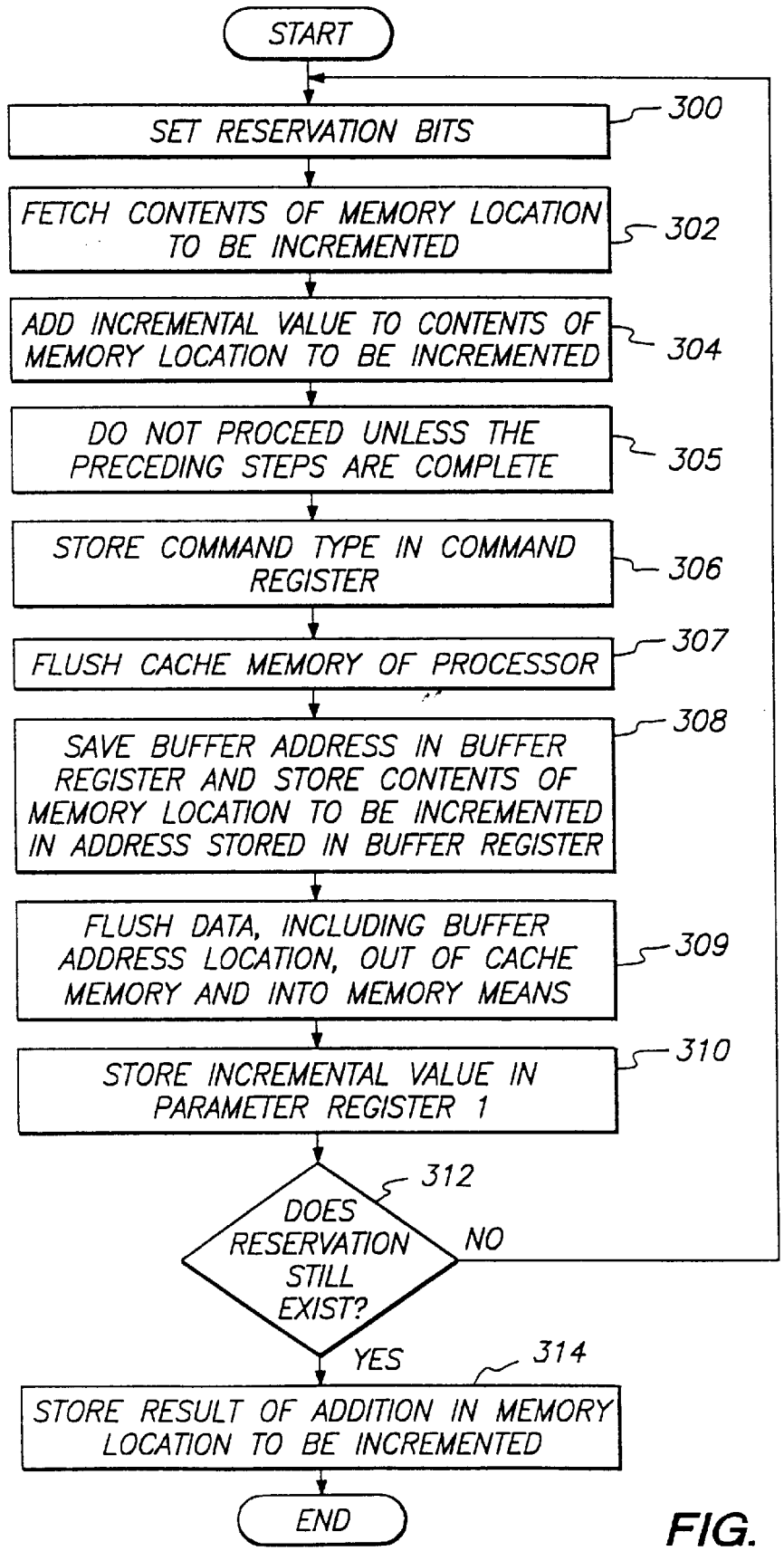
FIG. 8 is a flow chart showing an alternate method for performing an indivisible memory operation where the processor has a cache memory.

Referring now to FIG. 8, a flowchart of an alternate method for performing indivisible memory operations is shown. Some processors 12 have internal cache memories that may be used in indivisible memory operations. All commands generated by the processor 12 must be visible to the logic supervisor 24 in order for the present invention to operate. The method illustrated in FIG. 8 is similar to the method illustrated in FIG. 7 with the addition of steps to ensure that all signals generated by the processor 12 are visible to the logic supervisor 24.

The method shown in FIG. 8 includes an additional step 305, after step 304, where the processor 12 is not allowed to continue with the method unless the prior steps have been completed. A command such as the "sync" command for the PowerPC processor may be used to implement this step. Those skilled in the art will recognize equivalent commands which may be used. After step 306, an additional step 307 has been added in the alternate method. In step 307, the processor 12 flushes the cache line containing the buffer address from its cache. This step prevents the processor 12 from using the cache memory when accessing the buffer address and ensures that the following buffer-address access executed by the processor 12 is visible to the logic supervisor 24. Finally, in additional step 309, the processor 12 forces the cache line containing the data at the buffer address into a local memory means 14. This step is included to ensure that the data at the buffer address is not cached, which simplifies the update of this value by the logic supervisor 24.

While the present invention has been described with reference to certain preferred embodiments, those skilled in the art will recognize that various modifications may be provided. For example, the present invention is described for performing indivisible memory operations, the operations performed by the present invention may be performed on any general or special purpose register. These and other variations upon and modifications to the preferred embodiments are provided for by the present invention, which is limited only by the following claims.

What is claimed is:

1. An apparatus for performing an indivisible memory operation in a computer system having a first processor coupled to a first bus and a first memory coupled to a second bus, the first memory having a plurality of memory locations, the apparatus comprising:

a logic supervisor including a controller, having inputs and outputs, the inputs of the controller coupled to the first bus, for monitoring the first bus for indivisible memory operations, determining whether the memory location for the indivisible memory operation is in the first memory, retrieving the indivisible memory operation from the first bus, and outputting the indivisible memory operation only if the memory location of the indivisible memory operation is in the first memory;

a bus bridge having a first input/output and a second input/output, the first input/output of the bus bridge coupled to logic supervisor to receive the indivisible memory operation and the second input/output of the bus bridge coupled to the second bus.

2. The apparatus of claim 1 wherein the logic supervisor further comprises:

a first address register having inputs coupled to the first bus and outputs coupled to the bus bridge, the first register for storing a memory address;

a second register having inputs coupled to the first bus and outputs coupled to the bus bridge, the second register for storing data that identifies the indivisible memory operation; and wherein the controller includes outputs coupled to the first register and the second register, for controlling the storage of data in the first and second register, the output of data from the first and second registers to the bus bridge, and the storage of an address from the first bus in the first register and data that identifies the indivisible memory operation in the second register if the address of the indivisible memory operation is in the first memory.

3. The apparatus of claim 2 wherein the logic supervisor further comprises a third register for storing a parameter used by the indivisible memory operation, the third register having data inputs coupled to the first bus, data outputs coupled to the bus bridge and control inputs coupled to receive signals from the controller.

4. The apparatus of claim 2 wherein the logic supervisor further comprises a plurality of parameter registers, each parameter register storing a parameter used by the indivisible memory operation, the parameter registers each having data inputs coupled to the first bus, data outputs coupled to the bus bridge and control inputs coupled to receive signals from the controller.

5. The apparatus of claim 3, wherein the logic supervisor further comprises a fourth register for storing a buffer address of a memory location that stores the contents of a memory location upon which the indivisible memory operation is to be performed, before the indivisible memory operation is executed, the fourth register having data inputs and outputs coupled to the first bus, data inputs and data outputs coupled to the bus bridge and control inputs coupled to receive signals from the controller.

6. The apparatus of claim 5 wherein the logic supervisor further comprises a first comparator, having inputs coupled to the first bus to receive addresses, and outputs coupled to the controller for comparing addresses on the first bus to predetermined addresses for the first register, second register, third register and fourth register and asserting signals sent to the controller if the address on the first bus matches one of the predetermined addresses.

7. The apparatus of claim 6, wherein the first comparator further comprises a plurality of decoders each having a first set of inputs, a second set of inputs, and an output, the first set of inputs coupled to the first bus to receive addresses, the second set of inputs hardwired to a respective predetermined addresses of the first register, second register, third register and fourth register, the output of each decoder identifying whether the predetermined addresses is for the first register, second register, third register or fourth register, respectively, are asserted on the first bus.

8. The apparatus of claim 6, wherein the logic supervisor further comprises a first data latch having data inputs and data outputs, the first data latch coupling the first register, the fourth register and the first comparator to the first bus.

9. The apparatus of claim 8, wherein the logic supervisor further comprises a second data latch having data inputs and data outputs, the second data latch coupling the second register and the third register to the first bus.

10. The apparatus of claim 9, wherein the first and second latches are bi-directional latches for receiving or asserting signals on the first bus.

11. The apparatus of claim 5, wherein the controller is coupled to the first bus to receive control signals and the controller further comprises a second comparator, having inputs coupled to the first bus to receive control signals, and outputs coupled to enable and latch the first register, second register, third register and fourth register, the second comparator comparing controller commands on the first bus to predetermined values for a reservation command and a store conditional command.

12. The apparatus of claim 2, wherein the apparatus returns contents of a first memory location in the first memory before the execution of the indivisible memory operation and stores the contents of the first memory at a second memory location.

13. The apparatus of claim 12, wherein each memory operation has a unique memory location in the first memory.

14. In a computer system having a processor, a first bus, a second bus, a first memory coupled to the first bus, and a second memory coupled to the second bus, a method for performing indivisible memory operations, the method comprising:

monitoring the first bus for a remote address signal and a reserve memory location signal with a logic supervisor;

storing in the logic supervisor said remote address signal, present on the first bus in a first register coupled to the first bus and the second bus, if the remote address signal and the reserve memory location signal are asserted on the first bus;

determining whether a second register coupled to the first bus and the second bus has been addressed;

storing a memory operation signal, present on the first bus, in the second register, if the second register has been addressed; and performing the operation specified in the second register at the location specified in the first register in the second memory by sending the address and control signal to a bus bridge.

15. The method of claim 14 further comprising the step of storing a buffer address signal, present on the first bus as a destination address of an operation, in a fourth register.

16. The method of claim 14 further comprising the steps of:

determining whether a third register has been addressed; and storing a first parameter to be used by an indivisible memory operation signal, present on the first bus, in a third register if the third register has been addressed.

17. The method of claim 16 further comprising the steps of:

determining whether a fifth register has been addressed; and storing a second parameter signal, present on the first bus, in a fifth register if the fifth register has been addressed.

18. The method of claim 14 further comprising the step of asserting a signal on the first bus, the signal directing the processor to receive data present on the first bus as return data from the reserve memory location.

19. The method of claim 15 further comprising the step of asserting a signal on the first bus, the signal inhibiting the processor from accessing a memory location indicated by the buffer address signal stored in the fourth register.

20. The method of claim 15 further comprising the step of storing the contents of the memory location indicated by the remote address signal in a memory location indicated by the buffer address signal stored in the fourth register.

21. The method of claim 16 further comprising the step of asserting a signal, the signal comprising the address signal and the first parameter signal, on the second bus to the second memory to perform the indivisible memory operation.

22. The method of claim 15 further comprising the step of flushing a cache memory of the processor to insure memory operations are visible.

* * * * *